(12) United States Patent
Lesiak et al.

(10) Patent No.: US 8,743,241 B2
(45) Date of Patent: Jun. 3, 2014

(54) WIDE DYNAMIC RANGE IMAGING

(75) Inventors: Christopher J. Lesiak, Lincoln, NE (US); Ahmed Bouzid, Lincoln, NE (US); David Franzen, Lincoln, NE (US)

(73) Assignee: LI-COR, Inc., Lincoln, NE (US)

( * ) Notice: Subject to any disclaimer, the term of this patent is extended or adjusted under 35 U.S.C. 154(b) by 45 days.

(21) Appl. No.: 13/106,740

(22) Filed: May 12, 2011

(65) Prior Publication Data

US 2011/0279706 A1 Nov. 17, 2011

Related U.S. Application Data

(60) Provisional application No. 61/334,109, filed on May 12, 2010.

(51) Int. Cl.
*H04N 5/235* (2006.01)

(52) U.S. Cl.
USPC ........................................ 348/229.1; 348/243

(58) Field of Classification Search
USPC .............................................. 348/229.1, 243
See application file for complete search history.

(56) References Cited

U.S. PATENT DOCUMENTS

| | | | |
|---|---|---|---|
| 6,496,309 B1 | 12/2002 | Bliton et al. | |
| 7,054,003 B2 | 5/2006 | Dorsel | |
| 7,286,232 B2 | 10/2007 | Bouzid | |
| 7,463,357 B2 | 12/2008 | Kralik et al. | |
| 2007/0025717 A1 | 2/2007 | Raskar et al. | |
| 2007/0065038 A1* | 3/2007 | Maschauer et al. | 382/274 |
| 2008/0015446 A1* | 1/2008 | Mahmood et al. | 600/476 |
| 2008/0253758 A1 | 10/2008 | Yap et al. | |
| 2009/0080194 A1 | 3/2009 | Bouzid et al. | |
| 2009/0129653 A1* | 5/2009 | DeHority et al. | 382/132 |
| 2010/0302399 A1* | 12/2010 | Lin | 348/222.1 |
| 2011/0182529 A1* | 7/2011 | Kempe et al. | 382/274 |

FOREIGN PATENT DOCUMENTS

| | | |
|---|---|---|
| JP | 2008-203138 A | 9/2008 |
| WO | WO 03/003057 A2 | 1/2003 |

OTHER PUBLICATIONS

EP Application No. 11 78 1317, Supplementary European Search Report, Dec. 16, 2013, 5 pages.

* cited by examiner

*Primary Examiner* — Twyler Haskins
*Assistant Examiner* — Fayez Bhuiyan
(74) *Attorney, Agent, or Firm* — Kilpatrick Townsend & Stockton LLP (57) ABSTRACT

Systems and methods are described for extending the dynamic range of imaging systems, and more particularly fluorescence or luminescence imaging systems, having low optical background and a linear detector response. Images of a sample at each of a set of exposure times are acquired, a system-level dark estimate for each exposure time is subtracted from each image to form dark-corrected images, and the different exposures (dark-corrected images) are merged into a wider dynamic-range image. Typically merging is performed on a pixel-by pixel basis.

36 Claims, 5 Drawing Sheets

Figure 3a $$D_{ij}(t) = m_{ij} \cdot t + b_{ij}$$

WIDE DYNAMIC RANGE IMAGING

CROSS-REFERENCES TO RELATED APPLICATIONS

This application claims the benefit of U.S. Provisional Application Ser. No. 61/334,109, filed May 12, 2010, the disclosure of which is incorporated herein by reference in its entirety.

BACKGROUND

The present invention relates generally to imaging systems, and more particularly to extending the dynamic range of an imaging system, particularly fluorescence imaging systems.

U.S. Pat. No. 7,286,232 and Application publication No. 2009/0080194, both of which are hereby incorporated by reference, describe a laser-based fluorescence imaging system with an enhanced optical filtering technique and uniform laser illumination that enables it to achieve high sensitivity and high dynamic range. In order to further provide repeatable quantification with this technology for a wider range of applications, it is desirable to have an even wider dynamic range capability so that users do not have to guess what exposure to use for imaging a sample. Also, this design is capable of producing repeatable signal-to-noise performance and the relationship between laser power, filtering efficiency, and CCD exposure time is known by design. This makes it well-suited for the efficient implementation described below to extend its use to cover applications with varying dynamic ranges.

Blinton et al. (U.S. Pat. No. 6,496,309) describe an apparatus that uses lamp light sources, filter wheels, and a CCD camera with an extended dynamic range. As is established by U.S. Pat. No. 7,286,232, laser-based fluorescence imaging lends itself much more easily to enhanced spectral filtering techniques to suppress optical background, especially for wide-area imaging. This, in turn, translates to better sensitivity of detection with lasers, an important factor in achieving wide dynamic range extension. Blinton et al. use a scattergram algorithm approach to check for saturation, change exposure time, and iterate until the captured image is noise-dominated. This method is, however, inefficient in that it uses an un-predictable trial-and-error approach and is limited by the above described optical background noise and camera noise (dark, blooming, and radiation events.)

Therefore it is desirable to provide systems and methods that overcome the above and other problems.

BRIEF SUMMARY

The present invention provides systems and methods for extending the dynamic range of imaging systems, and more particularly fluorescence imaging systems.

According to one embodiment, a procedure for extending the dynamic range of an imaging system having low optical background, and a linear detector response, includes acquiring images at each of a set of exposure times, subtracting a system-level dark estimate at each exposure time, and merging the different exposures into a wider dynamic-range image.

In certain aspects, the choice of exposure times includes duplicates, and are arranged around the longest exposure time. In certain aspects, the dark estimates are obtained by acquiring a set of low-light images with a low exposure-time and another set with a longer exposure-time and using line-fitting to find the estimate at other exposure times. For non-constant emission rates, the obtained zero-offset images are re-mapped on a linear exposure-time scale. A regression line-fit is then obtained to estimate the slope as a measure of the extended, wide dynamic range response of the system. In certain aspects, in the regression fitting and linear interpolation steps, weighting factors are used to de-emphasize the use of pixel values that are close to saturation.

According to one embodiment, a method is provided for extending the dynamic range of an imaging system having a detector with a linear response. The method typically includes acquiring a plurality of images of a sample using the detector, each image being acquired with a different exposure time, each image having a plurality of pixels, each pixel having an intensity value. The method also typically includes subtracting from each acquired image a calibrated dark image corresponding to the exposure time for each acquired image to produce a plurality of dark-corrected images, and on a per pixel basis, determining a merged pixel value using values of the corresponding pixel from each of the plurality of dark-corrected images. In certain aspects, determining a merged pixel value includes fitting a linear regression to the pixel values of the corresponding pixel from each of the plurality of dark-corrected images. For example, fitting produces a linear function, and the merged pixel value corresponds to the slope of the linear function. In certain aspects, subtracting includes accessing calibrated dark image data for the system, wherein the calibrated dark image data includes a dark image value for each pixel as a function of exposure time, and subtracting, on a per pixel basis, the dark image value for a pixel from the pixel intensity value. In certain aspects, the calibrated dark image data is determined by acquiring by the detector at least one first dark image for the plurality of pixels at a first exposure time with no light sources on and with no sample present, by acquiring by the detector at least one second dark image for the plurality of pixels at a second exposure time different than the first exposure time and with no light sources on and with no sample present, and for each pixel, by fitting a line between the at least one first dark image and the at least one second dark image whereby the fitted line represents a dark image value for the pixel as a linear function of exposure time. In certain aspects, the dark image data is previously determined and stored to memory in the imaging system.

According to another embodiment, an imaging system is provided that typically includes a sample platform, a detector with a linear response, such as a CCD or other detector, where the detector acquires a plurality of images of a sample on the platform, each image being acquired with a different exposure time, each image having a plurality of pixels, each pixel having an intensity value. The system also typically includes a memory that stores calibrated dark image data for the system, where the calibrated dark image data includes a dark image value for each pixel as a function of exposure time. The system also typically includes an intelligence module, e.g., a processor, coupled to the detector and to the memory, wherein the intelligence module is adapted to receive the images from the detector, to subtract from each acquired image a calibrated system dark image corresponding to the exposure time for each acquired image to produce a plurality of dark-corrected images, and to determine, on a per pixel basis, a merged pixel value using values of the corresponding pixel from each of the plurality of dark-corrected images. In certain aspects, the method further includes displaying a representation of the merged pixel values, e.g., on a display device.

In certain aspects, light emission from the sample has a rate that is substantially constant over time, e.g., fluorescence, and the detector acquires the plurality of images in order of increasing or decreasing exposure time. In certain aspects, light emission from the sample has a rate that is not constant over time, e.g., luminescence, and the detector acquires the plurality of images in an order where duplicate short exposure images are acquired, the acquisition of duplicate short exposure images being staggered around the acquisition of one or more images having a longer exposure time. In this case, in certain aspects, an effective exposure length is determined for each acquired image, wherein the effective exposure lengths are used when determining merged pixel values. In certain aspects, the system further includes a display device coupled with the processor, wherein the processor displays a representation of the merged pixel values on the display device.

In certain aspects, a merged pixel value is determined by fitting a line between the values of the corresponding pixel from each of the plurality of dark-corrected images whereby the fitted line represents a pixel value for the pixel. In certain aspects, the slope of the fitted line represents the pixel value.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

The present invention provides systems and methods for extending the dynamic range of imaging systems, and more particularly fluorescence imaging systems.

Figure 1:
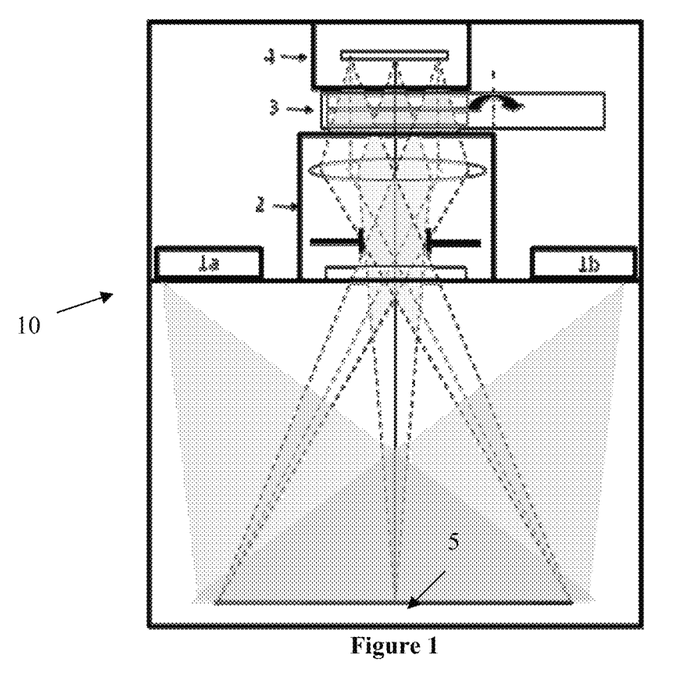
FIG. 1 illustrates a fluorescence imaging system according to one embodiment.

A fluorescence imaging system 10 according to one embodiment is shown in FIG. 1. System 10 includes at least one illumination source (two illumination sources 1a and 1b are shown). Typically an illumination source includes a laser, however, other illumination sources may be used as desired. As shown, in one embodiment, the two illumination sources include laser diode devices that are configured to emit at a desired wavelength (or frequency) or wavelengths (e.g., 680 nm or 780 nm) and are configured to illuminate platform 5. The laser sources are typically packaged with appropriate cooling elements and optical elements to direct their output onto platform 5. Light from platform 5 is directed and focused by imaging optics 2 onto detector 4, e.g., a CCD detector. Filter elements 3 are provided to facilitate filtering of the light that reaches detector 4. In certain aspects, system 10 is enclosed within a structure, such as a light-tight housing structure.

The imaging system 10 in an embodiment includes a CCD-based imaging system configured in a telecentric imaging and filtering architecture, such as described in U.S. Pat. No. 7,286,232, which is hereby incorporated by reference in its entirety. It is preferred to configure the illumination according to US Patent Application publication No. 2009/0080194, which is hereby incorporated by reference in its entirety. The system also uses a CCD-based detector 4 designed and configured to respond linearly to the detected amount of light as well as the length of time light exposes the detector (Exposure Time). For example, the Sony ICX285AL CCD operating within the lower $2/3$ of its full-well depth has shown a linear response to both and capable of a shortest exposure of about 50 µs.

System 10 also includes an intelligence module (not shown), such as one or more processors, that is communicably coupled with the detectors 4. The intelligence module is adapted to receive and process signals from the detector 4, e.g., signals representing, or proportional to, the detected illumination within the detectors' detection bandwidth. The intelligence module may automatically process the data and signals as received, or it may receive the data and signals and process subsequently, e.g., in response to a user command. An optional display device (not shown) is provided in certain embodiments to display data representative of various signals and images captured and/or processed by system 10. A memory module or device can also be provided to store data and code for use by the intelligence module, or for another system. For example, the memory may store code, executable by a processor, for implementing methods as disclosed herein, and/or data from the detectors and/or processor may be stored thereon. For example, calibrated system dark image data as discussed herein may be stored to the memory for later access and use by the intelligence module as described herein. The memory may include a RAM or ROM, hard disk or any portable, non-transitory medium such as a DVD or CD.

Figure 2:
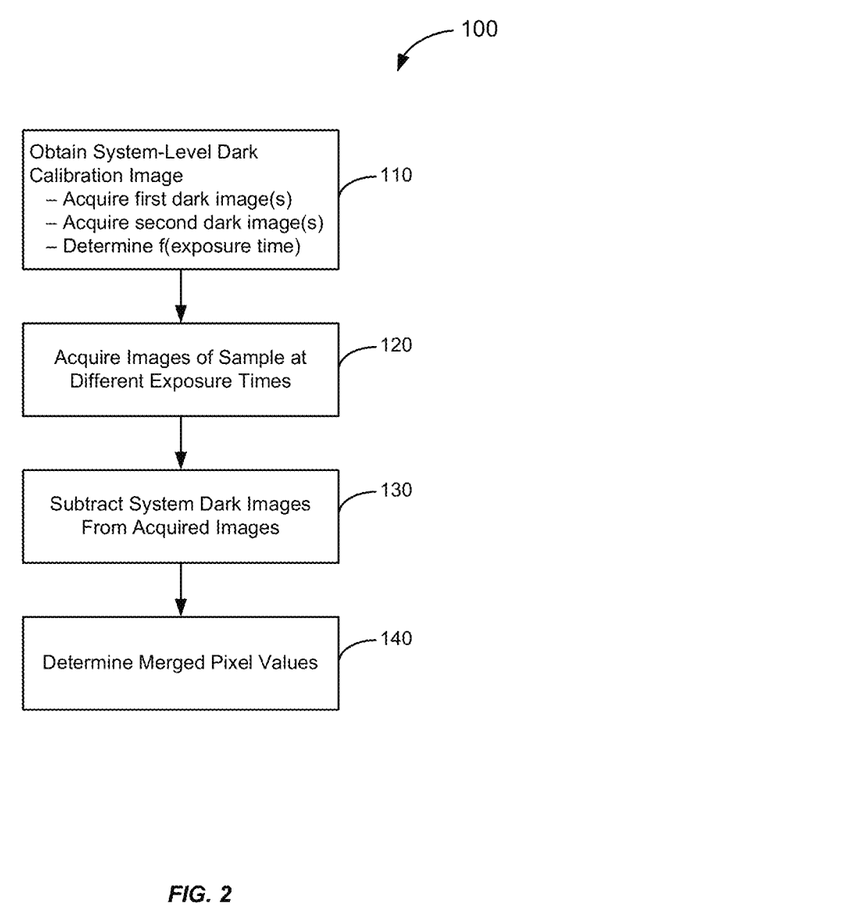
FIG. 2 illustrates a method of obtaining an extended dynamic range according to one embodiment.
Figures 3A, 3B:
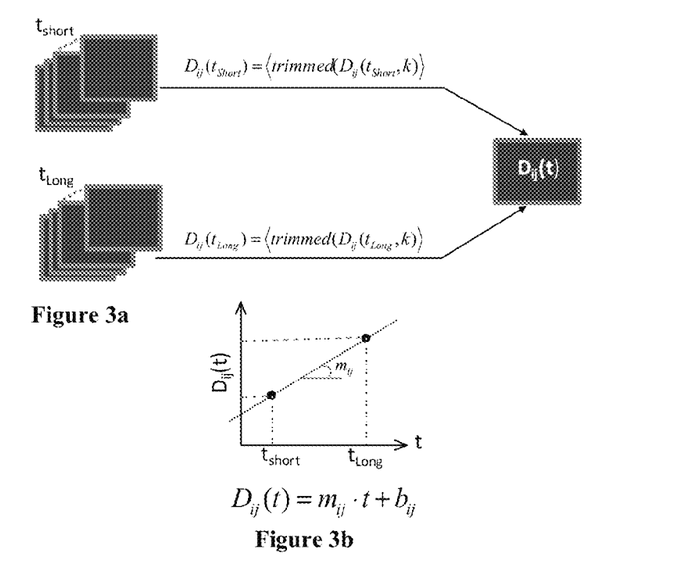
FIG. 3a illustrates short and long exposure dark images being acquired and optionally trimmed and averaged.
FIG. 3b illustrates an example result of a line fit to the acquired dark images.

FIG. 2 illustrates a method 100 for obtaining an extended dynamic range according to one embodiment. In particular, method 100 includes in step 110 obtaining a system-level dark calibration image to be used for a wide range of exposure times: D(t). As shown in FIG. 3a, one or a plurality of dark images are acquired at a first exposure time and one or a plurality of dark images are acquired at a second exposure time different from the first exposure time. As shown in FIG. 3b, a function (e.g., line) is determined, on a pixel-by-pixel basis, based on the dark images acquired at the first and second exposure times, where the function (e.g., line) represents a dark image value for the pixel as a function of exposure time. Aspects of step 110 will be discussed in more detail below. In step 120, an image with a desired longest exposure time is acquired and a set images with shorter exposure times are acquired (example: $t1=100$ s, $t2=10$ s, $t3=1$ s, $t4=0.1$ s, $t5=0.01$ s, and $t6=0.001$ s): im(ti), i=1-6. In step 130, a corresponding system dark is subtracted from each acquired image, i.e., $im0(ti)=im(ti)-D(ti)$, and in step 140, merged pixel values are determined. In one embodiment, for example, per-pixel slopes, as a measure of the merged response of the system, are calculated by fitting a linear regression to the pixel values taken at different exposures (where the slope of the fitted line for each pixel represents the pixel value of a dark-corrected image).

System Dark Calibration:

In one embodiment, the system-level dark calibration image is determined (e.g., step 110) by first acquiring by the detector at least one first dark image for a plurality of pixels at a first exposure time with no light sources on (and optionally with no sample present), then acquiring by the detector at least one second dark image for the plurality of pixels at a second exposure time different than the first exposure time and with no light sources on (and optionally with no sample present), and thereafter, for each pixel, fitting a line between the at least one first dark image and the at least one second dark image whereby the fitted line represents a dark image value for the pixel as a linear function of exposure time. In another embodiment, multiple first dark images are acquired and multiple second dark images are acquired as above. Thereafter an average first dark image value for each pixel is determined and an average second dark image value for each pixel is determined and fitting includes fitting a line between the average first dark image value and the average second dark image value.

According to one embodiment, in a system calibration step, a system-level dark image scalable for any exposure time up to a pre-set maximum value is obtained. This step includes turning off all light sources within the enclosure and placing an opaque plug in front of the detector (e.g., CCD) to prevent light collected by the imaging optics 2 from reaching the detector 4. This plug can be placed in one of the filter positions in a filter wheel 3. Alternatively, it can be placed in another wheel in front of the imaging optics 2. The housing for the various sub-systems and the overall enclosure are designed to keep light leakage from the outside and any residual light from the inside to a reasonably low level so that any registered signal on top of the CCD dark signal is minimal. Nevertheless, part of the reason for taking a "no-excitation", or "system-level dark", measurement is to include such residual effects in this calibration step. This way, absolute light-tightness of the enclosure is not required.

A set of Short exposure images and a set of Long exposure images are also acquired as shown in FIG. 3*a*. For example, 12×0.1 s and 12×30 min. Using matrix calculus, operating on a per pixel basis (matrix element), the top one or more (e.g., 10%) and the bottom one or more (e.g., 10%) values are discarded and the remainder are averaged within each set to obtain a trimmed average image at the short exposure (e.g., 0.1 s) and another at the long exposure (e.g., 30 min). The trimming gets rid of event-related noise such as bright pixels from radiation events. Averaging serves to average out random noise and thus reduce noise levels so that subsequent subtraction does not increase overall noise by a significant amount.

FIG. 3*b* illustrates the remaining step in this system-dark calibration procedure. In one embodiment, a line is fit between the Short-exposure and Long-exposure system darks and the slope values ($M_{ij}$) and offsets ($B_{ij}$) that relate the system-level dark value for each pixel as a linear function of exposure time, t are calculated, i.e.

$$D_{ij}(t) = M_{ij} \cdot t + B_{ij}$$

Subsequent operations can use an estimate of the system-level dark at any exposure time, t, by using t in the above matrix equation. For example, in one embodiment, the slope values ($M_{ij}$) and offsets (BO that relate the system-level dark value for each pixel as a linear function of exposure time, t are stored to memory in the imaging system for later use during image acquisition.

Multi-Exposure Merging:

In one embodiment of a procedure for producing a wide dynamic range image, the system acquires a set of images at different exposures, subtracts a corresponding system-level dark from each image to produce dark-corrected images, and then merge the dark-corrected images to form a wide dynamic range image. In certain aspects, merging includes determining, on a pixel-by-pixel basis, merged pixel values using values of the corresponding pixels from each of the dark corrected images. In certain aspects, determining merged pixel values includes applying a weighted least-square fit (regression) to the set of image arrays to obtain a "fit" matrix as a merge for all the exposures. The procedure is described schematically in FIG. 4.

Figure 7:
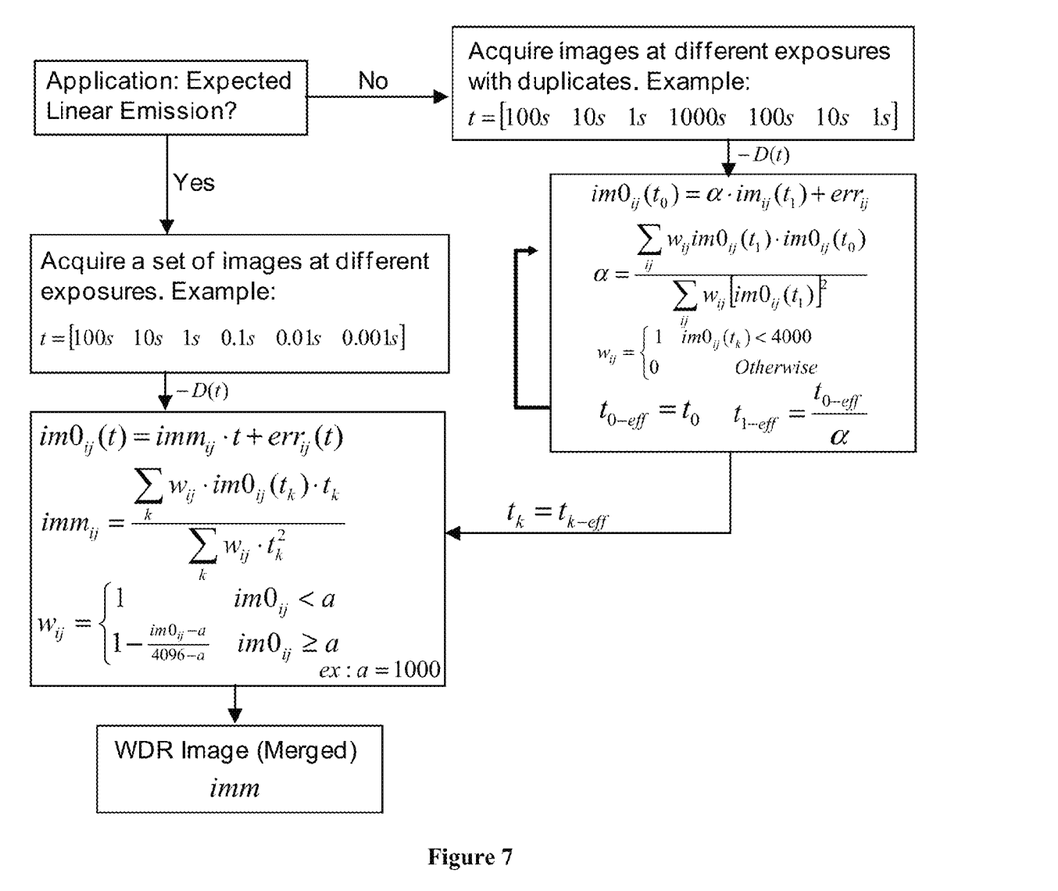
FIG. 7 illustrates a flow-chart that summarizes a procedure for producing a wide dynamic range image for both cases where the emission rate is constant and where the emission rate varies over time

The dark estimates are obtained by acquiring a set of low-light images with a low exposure-time and another set with a longer exposure-time and using line-fitting to find the estimate at other exposure times. For non-constant emission rates, the obtained zero-offset images are re-mapped on a linear exposure-time scale. A regression line-fit is then obtained to estimate the slope as a measure of the extended, wide dynamic range response of the system. In certain aspects, in the regression fitting and linear interpolation steps, weighting factors are used to de-emphasize the use of pixel values that are close to saturation. FIG. 7 illustrates a flow-chart that summarizes a procedure for producing a wide dynamic range image for both cases where the emission rate is constant and where the emission rate varies over time and gives examples for each.

Figure 4:
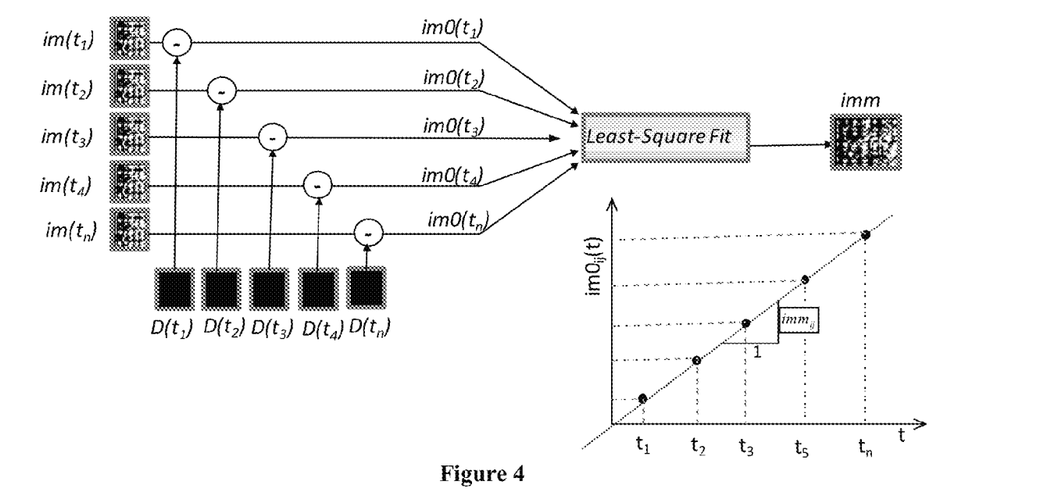
FIG. 4 illustrates schematically a process for determining wide dynamic range images.

1) Case of Constant Emission Rate:

For fluorescence imaging where the emission rate is constant and therefore the detection signal scales linearly with exposure time, one can acquire images at t1=100 s, t2=10 s, t3=1 s, t4=0.1 s, t5=0.010 s, and t6=0.001 s. The order of taking the images can vary depending on whether or not it is expected that dyes to be used have some permanent photo-bleaching. In that case, it is desirable to start with the short exposures first since any photo-bleaching has less cumulative effect on the long exposure than the shorter ones. The result is a set of images, im($t_k$) where k is the number of exposures. As shown in FIG. 4, a system dark at the corresponding exposure time is subtracted from each image and then the resulting set of dark-corrected images, im0($t_k$), are used in a per-pixel least-square fit with a "Counts/second" value for each pixel in the image. This linear fit of a zero-offset regression can be represented as $$im0_{ij}(t) = imm_{ij} \cdot t + err_{ij}(t)$$

where $$imm_{ij} = \frac{\sum_k w(im0_{ij}(t_k)) \cdot im0_{ij}(t_k) \cdot t_k}{\sum_k w(im0_{ij}(t_k)) \cdot t_k^2}$$

Figure 5:
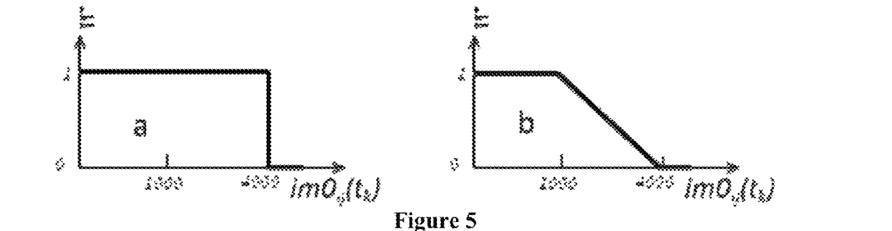
FIG. 5a shows a simple weighting factor map consisting of 1 for all values below a limit close to saturation and zero above it.
FIG. 5b shows a weighting factor that provides a smooth transition towards the zero value.

A weighting factor, w(im$0_{ij}$($t_k$)), is used to reduce the contributions of pixel values that are saturated or nearly saturated. FIG. 5*a* shows a simple weighting factor map having a value of 1 for all pixel values below a limit close to saturation and zero above the limit. Such a weighting factor can be used to eliminate saturated pixels from the regression. But, a different weighting factor provides a smooth transition towards the zero value, e.g., as shown in FIG. 5*b*, and where 4000 was used as an approximation to the saturation value for a "12-bit=4096" CCD detector.

The linear fit is itself a map image that links all the exposures, i.e. an extended dynamic range image representation in "Counts/sec" units. If "Counts" is desired instead, then one can multiply imm by the maximum exposure value. For the example of t=0.001 s to 100 s, the increase in dynamic range is equal to 10/0.001=10,000. For a 12-bit CCD, the resulting extended dynamic range of the system is >(12 bits+13 bits=25 bits).

Figure 6:
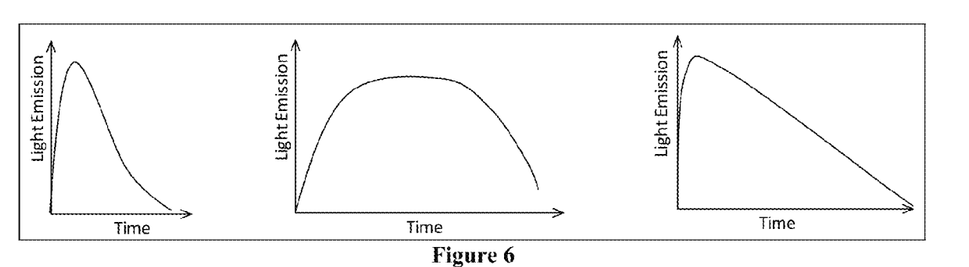
FIG. 6 depicts typical emission rates luminescent substrates may have.

2) Case of Varying Emission Rate:

There are other cases where light emission rate is not constant over time, such as in luminescence or when significant bleaching occurs. FIG. 6 depicts examples of varying emission rates, e.g., typical emission rates of luminescent substrates. According to one embodiment, the choice of exposure times includes duplicates, and are arranged around the longest exposure time. To maximize the collection from different types of substrates, in one embodiment duplicates are acquired of short exposure images staggered around one or more images of the longer acquisition times. For example, the plurality of images are acquired in an order wherein duplicate short exposure images are acquired, the acquisition of duplicate short exposure images being staggered around the acquisition of one or more images having a longer exposure time. An example of an acquisition order might be: t0=100 s, t1=10 s, t2=1 s, t3=1000 s, t4=100 s, t5=10 s, and t6=1 s. The following steps are then applied in one embodiment:

1) Subtract system Dark images to obtain zero-offset images, $im0(t_k)$, for every exposure time, $t_k$, k=0 to N=6.
2) Calculate an effective exposure length, $t_{k\text{-}eff}$, to approximate what would the time coordinate be if that image is to be mapped on a linear regression ($im0(t_k)$ vs. time) plot. One way this adjustment can be accomplished is as follows:
   a) Sort exposures (along with their corresponding zero-offset images) from longest to shortest, as $t_0$ to $t_N$.
   b) Set $t_{0\text{-}eff} = t_0$.
   c) Find the next effective exposure time, $t_{i\text{-}eff}$, using the following linear least-square fit:

$$im0_{ij}(t_0) = \alpha \cdot im_{ij}(t_1) + err_{ij}$$

$$\alpha = \frac{\sum_{ij} w_{ij} im0_{ij}(t_1) \cdot im0_{ij}(t_0)}{\sum_{ij} w_{ij} [im0_{ij}(t_1)]^2}$$

$w_{ij}=1$ if $im_0(t_0)<4000$ and $w_{ij}=0$, otherwise.

and $$t_{1\text{-}eff} = \frac{t_{0\text{-}eff}}{\alpha}$$

d) Estimate subsequent effective exposures $t_{2\text{-}eff} \ldots T_{N\text{-}eff}$ by repeating the procedure outlined in c) above. For cases, with replicate $T_k$, use the one with largest $T_{k\text{-}eff}$ in subsequent estimates.
3) Apply the per-pixel linear regression mapping described in the "case of constant emission rate" above in order to calculate the wide-dynamic range mapping, imm.

Other sequences of exposure times and duplicates that can be averaged to reduce noise can be used to better match other imaging applications. Additional filtering methods can be incorporated to even further reduce noise effects.

It is also understood that merging can be accomplished using other methods of combining images taken at different exposures together to obtain an image representing the information existing in each. Examples include replacing saturated signals from longer exposure images with appropriately scaled copies of their counterparts in images taken at shorter exposures. The above described method of merging by least-square-fitting and linear regression approximation was found to be efficient and accurate for most common fluorescence and luminescence applications.

All US patents and applications mentioned herein are hereby incorporated by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for extending a dynamic range of an imaging system, the method comprising:
   acquiring a plurality of images of a sample using a detector with a linear response, each sample image being acquired with a different exposure time, each sample image having a plurality of pixels;
   obtaining a dark calibration line fit from memory, the dark calibration line fit based on values of corresponding pixels from multiple dark calibration images, at least one dark calibration image having a longer exposure time than another of the dark calibration images, wherein the dark calibration line fit represents a dark image value for each corresponding pixel as a function of exposure time;
   determining a system-level dark value for each pixel in the sample images, based on the exposure time of the sample image and the dark calibration line fit, to create a system-level dark calibration image;
   subtracting from each sample image the system-level dark calibration image corresponding to the exposure time for each sample image to produce a plurality of dark-corrected images; and
   fitting a linear regression to values of pixels that correspond between the dark-corrected images to determine a merged pixel value.

2. The method of claim 1, further including displaying a representation of the merged pixel value.

3. The method of claim 1, wherein the fitting the linear regression produces a linear function, and wherein the merged pixel value corresponds to a slope of the linear function.

4. The method of claim 1, wherein the fitting the linear regression includes applying a least squares fit to the pixels that correspond between the dark-corrected images.

5. The method of claim 1, further comprising:
   acquiring multiple first dark calibration images and determining an average first dark image value for each corresponding pixel of the acquired multiple first dark calibration images;
   acquiring multiple second dark calibration images and determining an average second dark image value for each corresponding pixel of the acquired multiple second dark calibration images;
   determining a dark calibration line fit based on values of corresponding pixels from the first and second multiple dark calibration images; and
   saving to memory the dark calibration line fit.

6. The method of claim 5, further comprising:
removing one or more of a highest dark image value and one or more of a lowest dark image value prior to averaging dark image values.

7. The method of claim 1, wherein light emission from the sample has a rate that is substantially constant over time.

8. The method of claim 7, wherein the plurality of images are acquired in order of increasing or decreasing exposure time.

9. The method of claim 7, wherein the imaging system is a fluorescence imaging system.

10. The method of claim 1, wherein light emission from the sample has a rate that is not constant over time.

11. The method of claim 10, wherein the plurality of sample images are acquired in an order wherein duplicate short exposure images are acquired, said acquisition of duplicate short exposure images being staggered around an acquisition of one or more images having a longer exposure time.

12. The method of claim 10, wherein the imaging system is a luminescence imaging system.

13. The method of claim 10, further including determining an effective exposure length for each acquired image, wherein the effective exposure lengths are used when determining merged pixel values.

14. An imaging system, comprising:
a sample platform;
a detector with a linear response, wherein the detector is configured to acquire a plurality of images of a sample on the platform, each sample image being acquired with a different exposure time, each sample image having a plurality of pixels;
a memory that stores a dark calibration line fit, the dark calibration line fit based on values of corresponding pixels from multiple dark calibration images, at least one dark calibration image having a longer exposure time than another of the dark calibration images, wherein the dark calibration line fit represents a dark image value for each corresponding pixel as a function of exposure time;
an intelligence module coupled to the detector and to the memory, wherein the intelligence module is adapted to:
receive the images of the sample from the detector,
obtain the dark calibration line fit from the memory,
determine a system-level dark value for each pixel in the sample images, based on the exposure time of the sample image and the dark calibration line fit, to create a system-level dark calibration image;
subtract from each sample image the system-level dark calibration image corresponding to the exposure time for each sample image to produce a plurality of dark-corrected images; and
fit a linear regression to values of pixels that correspond between the dark-corrected images to determine a merged pixel value.

15. The system of claim 14, wherein the fitting the linear regression produces a linear function, and wherein the merged pixel value corresponds to a slope of the linear function.

16. The system of claim 14, wherein the fitting the linear regression includes applying a least squares fit to the pixels that correspond between the dark-corrected images.

17. The system of claim 14, wherein the intelligence module is further adapted to:
acquire multiple first dark calibration images and determining an average first dark image value for each corresponding pixel of the acquired multiple first dark calibration images;
acquire multiple second dark calibration images and determining an average second dark image value for each corresponding pixel of the acquired multiple second dark calibration images;
determine a dark calibration line fit based on values of corresponding pixels from the first and second multiple dark calibration images; and
save to memory the dark calibration line fit.

18. The system of claim 17, wherein the intelligence module is further adapted to:
remove one or more of a highest dark image value and one or more of a lowest dark image value prior to averaging dark image values.

19. The system of claim 14, wherein light emission from the sample has a rate that is substantially constant over time.

20. The system of claim 19, wherein the detector acquires the plurality of images in order of increasing or decreasing exposure time.

21. The system of claim 19, wherein the imaging system is a fluorescence imaging system.

22. The system of claim 14, wherein light emission from the sample has a rate that is not constant over time.

23. The system of claim 22, wherein the detector acquires the plurality of sample images in an order wherein duplicate short exposure images are acquired, said acquisition of duplicate short exposure images being staggered around an acquisition of one or more images having a longer exposure time.

24. The system of claim 22, wherein the intelligence module further determines an effective exposure length for each acquired image, wherein the effective exposure lengths are used when determining merged pixel values.

25. The system of claim 14, wherein the detector includes a CCD array detector.

26. The system of claim 14, wherein the intelligence module includes a processor.

27. The system of claim 14, further including a display device coupled with the processor, wherein the processor displays a representation of the merged pixel values.

28. A method for extending a dynamic range of an imaging system, the method comprising:
acquiring a plurality of images of a sample using a detector with a linear response, each sample image being acquired with a different exposure time, each sample image having a plurality of pixels;
interpolating with respect to exposure time a dark image value for each pixel from dark images collected with different exposure times, the interpolating of the dark image value based on a function of exposure time of the respective acquired image;
subtracting from each acquired image pixel the interpolated dark image value corresponding to the exposure time for each acquired image to produce a plurality of dark-corrected images; and
determining a merged pixel value using values of corresponding pixels from the dark-corrected images.

29. A non-transitory machine-readable tangible medium embodying information indicative of instructions for causing one or more machines to perform the operations of claim 28.

30. A non-transitory machine-readable tangible medium embodying information indicative of instructions for causing one or more machines to perform the operations of claim 1.

31. The system of claim 14, further comprising:
a laser diode illumination source configured to illuminate the sample on the platform.

32. The system of claim 31, wherein the laser diode illumination source has a wavelength of 680 nanometers (nm) or 780 nm.

33. The method of claim 1, wherein determining the fit dark calibration image includes interpolating between at least two of the dark calibration images.

34. The method of claim 1, further comprising:
   determining a slope value and an offset value between each corresponding pixel in the dark calibration images, wherein the determining the fit dark calibration image uses the slope value and offset value.

35. The method of claim 1, further comprising:
   placing an opaque plug in front of a detector during the acquiring of the multiple first and second dark calibration images.

36. The method of claim 1, wherein the opaque plug is placed in front of the detector using a filter wheel.

* * * * *